Nov. 13, 1928.
A. SCHÜCKHER
1,691,827
APPARATUS FOR PURIFYING AND MOISTENING AIR
Filed Feb. 15, 1924
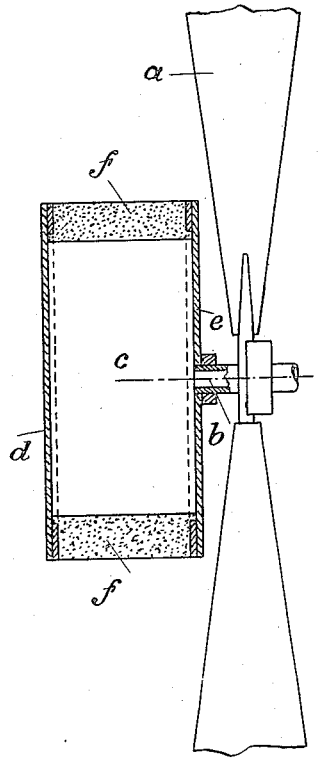
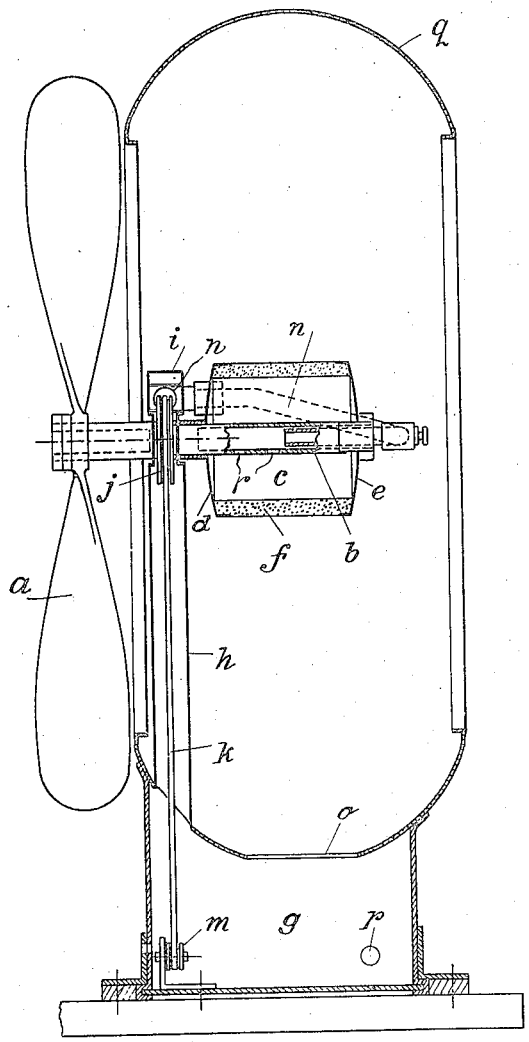

Patented Nov. 13, 1928.

1,691,827

UNITED STATES PATENT OFFICE.

ALBERT SCHÜCKHER, OF VIENNA, AUSTRIA.

APPARATUS FOR PURIFYING AND MOISTENING AIR.

Application filed February 15, 1924, Serial No. 693,143, and in Austria February 19, 1923.

In closed rooms air is frequently cooled by evaporating water either in evaporating vessels made of some suitable porous material or by means of mechanical spraying devices. Evaporating vessels are objectionable for a variety of reasons and more particularly because their effect is always comparatively small and cannot be controlled to suit given conditions. In case of spraying or atomizing devices which discharge water into the room to be cooled in the form of fine drops, the drops are still so great that they do not completely evaporate while flying through the air and thereby the effect of such devices is reduced and besides water accumulates in the neighbourhood of such devices.

The object of my invention is to provide a device which is much more efficient than the apparatus for cooling spaces as above referred to and which obviate the drawbacks of the apparatus heretofore used. With these objects in view my improved apparatus consists in that I use a revolving container or vessel for the liquid and that the liquid escapes from this vessel through porous bodies being forced through the pores by centrifugal force into the surrounding air in the form of fine drops or of a mist.

In the annexed drawing I have shown by way of example two embodiments of my improved device.

Fig. 1 is a diagrammatical vertical section of one embodiment,

Fig. 2 is a similar view of another embodiment.

Fig. 3 is a fragmentary vertical sectional detail through the upper portion of the pipe and the cap a view being taken at right angles to the view shown in Fig. 2.

In the drawing Fig. 1 $b$ is a shaft driven by any suitable motor, preferably an electric motor not shown; $c$ is a drum mounted on this shaft, the covers of this drum consist of metal or other substance impervious to water while its cylindrical periphery $f$ consists of some suitable porous material. The porosity of this material is preferably so selected that water contained in the drum $c$ cannot under the sole action of gravity penetrate to any considerable extent through the periphery $f$, but that it is forced through the periphery by centrifugal force when the drum is revolved at a suitable speed. The water forced out through the pores of the periphery is in the form of exceedingly minute drops or in the form of a mist which remains suspended in the air until completely evaporated.

The cylindrical periphery $f$ may be made of any suitable filtering material preferably felt or the like.

Preferably the drum $c$ serving for producing the mist is combined with a fan $a$ driven from the same source of power as the drum, say by mounting it on the shaft $b$ as shown in the drawing.

In order to supply liquid to the drum during the operation of the device the shaft $b$ is hollow and may be connected either to a receptacle not shown located at a higher level or to a water main.

In the preferred embodiment of my invention shown in Fig. 2, the device is in the form of a portable table fan, having a hollow base $g$ serving as water receptacle from which water is supplied to the drum $c$ located at a higher level by any suitable means. As shown in Fig. 2 I provide for this purpose a vertical pipe $h$ through the upper end of which passes the hollow shaft $b$ such upper end being closed by a cap $i$. On the shaft $b$ is mounted within the pipe $h$ a small pulley $j$ and an endless band $k$ passes round this pulley and another pulley $m$ mounted in the receptacle $g$. When the shaft $b$ revolves the band $k$ which may be made of rubber, coiled wire or other suitable material, is moved by the pulley $j$ and takes with it some liquid from the receptacle $g$ owing to adhesion. This liquid is whipped off or thrown off by centrifugal force within the cap $i$ then flows through the small inclined pipe $n$ into the hollow shaft $b$ from which it escapes into the revolving drum $c$, through holes $r$ in the pipe $b$.

In order that the liquid which is thrown into the cap will pass into the pipe $n$ the upper end of the pipe $h$ is preferably extended slightly above the bottom of the cap as shown at $h'$ in Fig. 3. This extension prevents the water from returning through the pipe $h$.

An opening $o$ serves for replenishing and a small opening $p$ provided with a suitable removable plug not shown serves for emptying the receptacle $g$. $q$ is a frame enclosing the drum $c$ and mounted on the base $g$.

When the pores of the material from which the periphery of the drum is made are sufficiently small, water passes into the surrounding air to be cooled only when the fan is in operation. Thereby an imperfect evaporation and an accumulation of water not evaporated is avoided with certainty.

Only minute drops of liquid can be thrown through the periphery of the drum into the air, but owing to the extremely large number of such drops, the air is efficiently moistened and cooled.

What I claim is:

1. In a device for purifying and moistening air, a base adapted to contain a supply of liquid, a hollow shaft rotatably mounted above the base, a fan mounted on said shaft, a drum secured to said shaft and arranged in connection therewith and adapted to receive liquid therefrom and having the outer periphery constructed of porous material so that liquid may be forced therethrough owing to centrifugal action, a tubular support arranged vertically in the base and in connection therewith and serving as a support for the shaft, a liquid receiving member at the top of the tubular part, means for conducting liquid from the base through the support to the receiving member, and means for conducting liquid from the receiving member to the shaft.

2. In a device for purifying and moistening air, a base adapted to contain a supply of liquid, a hollow shaft rotatably mounted above the base, a fan mounted on said shaft, a drum secured to said shaft and arranged in communication therewith and adapted to receive a liquid therefrom and having the outer periphery constructed entirely of porous material whereby during rotation of the shaft due to centrifugal action the liquid will be forced through the porous material in the form of a fine spray, and means for conducting liquid from the base to the tubular shaft including a tubular support arranged vertically in the base in communication therewith and serving as a support for the shaft, pulley wheels mounted respectively on the shaft and in the base, the pulley wheel on the shaft being confined by the tubular support, a belt operating about the pulley wheels for raising the liquid, a receiving member on the top of the tubular support for the liquid, and a conducting pipe between the receiving member and the shaft, substantially as and for the purposes set forth.

In testimony whereof I affix my signature.

ALBERT SCHUCKHER.